(12) United States Patent
Meyer

(10) Patent No.: US 8,230,385 B2
(45) Date of Patent: Jul. 24, 2012

(54) TEST EFFORT ESTIMATOR

(75) Inventor: Catherine Meyer, Courbevoie (FR)

(73) Assignee: International Business Machines Corporation, Armonk, NY (US)

( * ) Notice: Subject to any disclaimer, the term of this patent is extended or adjusted under 35 U.S.C. 154(b) by 1609 days.

(21) Appl. No.: 11/590,168

(22) Filed: Oct. 31, 2006

(65) Prior Publication Data

US 2007/0174702 A1 Jul. 26, 2007

(30) Foreign Application Priority Data

Nov. 18, 2005 (EP) ..................................... 05300950

(51) Int. Cl.
*G06F 9/44* (2006.01)
(52) U.S. Cl. ......... 717/101; 717/102; 717/103; 717/109
(58) Field of Classification Search .................. None
See application file for complete search history.

(56) References Cited

U.S. PATENT DOCUMENTS

| | | | | |
|---|---|---|---|---|
| 5,652,835 | A * | 7/1997 | Miller | 714/38 |
| 6,073,214 | A * | 6/2000 | Fawcett | 711/133 |
| 6,725,399 | B1 * | 4/2004 | Bowman | 714/38 |
| 6,859,770 | B2 * | 2/2005 | Ramsey | 703/16 |
| 7,464,119 | B1 * | 12/2008 | Akram et al. | 1/1 |
| 2003/0212583 | A1 * | 11/2003 | Perras et al. | 705/7 |
| 2004/0015377 | A1 * | 1/2004 | Hostetler | 705/7 |
| 2004/0073886 | A1 * | 4/2004 | Irani | 717/101 |
| 2005/0043919 | A1 * | 2/2005 | Kennedy et al. | 702/182 |
| 2005/0171831 | A1 * | 8/2005 | Johnson et al. | 705/10 |
| 2006/0069521 | A1 * | 3/2006 | Meyer et al. | 702/42 |
| 2006/0123389 | A1 * | 6/2006 | Kolawa et al. | 717/101 |
| 2007/0174702 | A1 * | 7/2007 | Meyer | 714/33 |

OTHER PUBLICATIONS

Nageswaran S., "Test Effort Estimation Using Use Case Points", Cognizant Technology Solutions, Jun. 2001, pp. 1-6.
Patel N., et al., "Cognizant Technology Solutions, Test Case Point Analysis", White Paper Version 1.0, Apr. 11, 2001, Cognizant Technology Solutions, pp. 1-13.
Bassin, K., et al., "Metrics to evaluate vendor-developed software based on test case execution results", IBM Systems Journal, vol. 41, No. 1, 2002, pp. 13-30.

* cited by examiner

*Primary Examiner* — Isaac Tecklu
(74) *Attorney, Agent, or Firm* — Schmeiser, Olsen & Watts; John Pivnichny

(57) ABSTRACT

A system, method, and computer program product for evaluating the test effort to be provided for functional testing during an application development project is disclosed. The major influencing parameters within testing applications in complex systems are used to compute a test case management effort and a defect effort, those parameters being scope, duration and product quality related, or organization related. A test effort consolidated measurement is generated and provided as a final summary report in a user-friendly format suitable for management analysis.

24 Claims, 12 Drawing Sheets

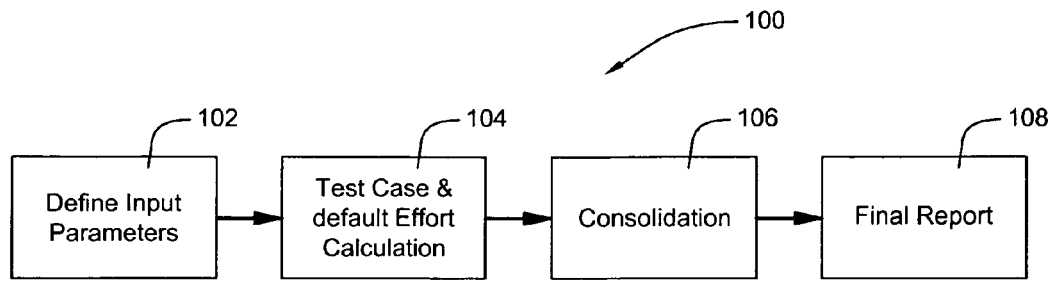

FIG. 1

| | Test Coverage | Total | | Coverage Mini | Coverage Max | Coverage Average |
|---|---|---|---|---|---|---|
| 202 | Functional coverage of new release: | | | | | |
| | Number of new functionalities | | | 93 | 100 | 97 |
| | Number of business scenarios impacted | | | 100 | 120 | 110 |
| 206 | Out of which number of critical Business Scenarios + Most used flows impacted | | | 50 | 60 | 55 |
| | Total scenarios | | | | | |
| 208 | where 1 Scenario = | 10 | Test Cases | | | |
| | Total Test Cases (TC) | 1 319 | | | | |
| 210 | where 1 TC = | 15 | Test Steps | | | |
| | Grand Total Test Steps (TS) | 19 781 | | | | |
| | *Total Test Steps* | 15 825 | | | | |
| | Total Test Steps baseline | 7 500 | | 80% | 100% | 90% |
| | Out of which Key Business Test Steps | 3 750 | | 100% | 100% | 100% |
| | Intermediate TS Regression | 3 825 | | 50% | 100% | 75% |
| | Test Steps Final Regression | 4 500 | | 100% | 100% | 100% |
| | *Change Requests impacted* | | | | | |
| | % of additional Test Steps | 3 956 | 25% | | | |

FIG. 2

| Test Duration | Number of Weeks | Start Date | End Date |
|---|---|---|---|
| Number of Testing Weeks | 15 | 03/01/2005 | 18/04/2005 |
| Test preparation | 4 | 03/01/2005 | 03/02/2005 |
| Effective Testing without final Regression | 7 | 03/02/2005 | 21/03/2005 |
| Effective Final Regression + Closure | 5 | 14/03/2005 | 18/04/2005 |
| Forecasted Outage in weeks | 1 | | |
| Number of Testing Days | 53 | | |
| Testing without final Regression | 33 | | |
| Final Regression | 25 | | |
| Forecasted Outage | 5 | | |

FIG. 3

| Solution Quality | | | | | |
|---|---|---|---|---|---|
| Design quality/Requirement stability | 2 | (1 to 5, when 1 is low and 5 is high) | | | |
| | | | | | |
| Solution complexity | 2 | (1 to 5, when 1 is low and 5 is high) | | | |
| | Total | | Mini % | Max % | Average |
| Number of Defects | 1358 | 9% | | | |
| *for baseline+ intermediate regression* | 906 | | 8% | 15% | 12% |
| *Severity distribution : % of total defect* | | | | | |
| Severity 1 | 181 | | 20% | | |
| Severity 2 | 453 | | 50% | | |
| Severity 3 & 4 | 272 | | 30% | | |
| *for Change Request Impact (same distribution as for baseline)* | 317 | | 8% | | |
| Severity 1 | 181 | | 20% | | |
| Severity 2 | 453 | | 50% | | |
| Severity 3 & 4 | 272 | | 30% | | |
| *for Final Regression* | 135 | | 3% | 5% | 4% |
| Severity 1 | 34 | | 25% | | |
| Severity 2 | 88 | | 65% | | |
| Severity 3 & 4 | 14 | | 10% | | |
| Defect turnaround time in days in development | | | | | |
| *Average turnaround time* | 4 | | | | |
| For Severity 1 | 2 | | | | |
| For Severity 2 | 4 | | | | |
| For Severity 3+4 | 5 | | | | |
| 1 Week = | 5 | Working Days | | | |
| | | | | | |
| Number of Re-test to correct 1 defect | 1575 | 10% | | | |
| | # of retest | % of final correction with n dev delivery | | | |
| n = 1st patch (corrected with the 1st patch) | 1 | 85% | | | |
| n = 2nd patch (corrected with the 2nd patch) | 2 | 14% | | | |
| n = 3rd patch (corrected with the 3rd patch or more) | 3 | 1% | | | |
| Total Ponderation on Initial Retest | | 116% | | | |

| Defect Analysis effort | | | Nb Mini | Nb Max |
|---|---|---|---|---|
| Number of Releases in Parallel | 1 | | | |
| Impact of Number of Releases in Parallel | 5% | Of additional effort | | |
| Defect Analysis Productivity : Average Number of defects analyzed per man/week | 30 | | 20 | 40 |

| Team Leaders in FTE | Average | | Mini | Max |
|---|---|---|---|---|
| Test Cases (or Steps) documentation Management in FTE | 0,5 | | 0,50 | 0,50 |
| Test Cases (or Steps) Key-in Management in FTE | 0,5 | | 0,50 | 0,50 |
| Defect Management in FTE during test execution phase | 1,0 | | 1,00 | 1,00 |
| Defect Analysis Management in FTE during test execution phase | 0,5 | | 0,50 | 0,50 |

| Average Time to Produce | |
|---|---|
| Average Time to prepare a Test Step in mn | 12 |
| Average Time to key-in a Test Step in mn | 5 |
| Data attribution factor in % | 15% |
| Productivity factor % | 85% |
| Change management ratio % | 25% |
| Average time to document an error in % | 25% |

| Test Cases Documentation Effort in test steps | if coverage is 100% | Coverage rate in % | | | Number test steps | | |
|---|---|---|---|---|---|---|---|
| | | Min | Max | Average | Min | Max | Average |
| Number of test steps for new functionalities | 7500 | 80% | 100% | 90% | 6000 | 7500 | 6750 |
| Out of which Critical Flows : Number of test steps for new functionalities | 3750 | 100% | 100% | 100% | 3750 | 3750 | 3750 |
| Regression package | | | | | | | |
| out of which first regressions | 3825 | 50% | 100% | 75% | 1913 | 3825 | 2869 |
| out of which final regression | 4500 | 100% | 100% | 100% | 4500 | 4500 | 4500 |
| Number of Test Preparation Week | 4,43 | | | | | | |
| Total if coverage of full new functionalities | 15825 | 77% | 100% | 88% | 12413 | 15825 | 14119 |
| Total if coverage of critical new functionalities | 12075 | 83% | 100% | 92% | 10163 | 12075 | 11119 |

FIG. 6a 604, 606

| Test Cases Documentation Effort | Test Case Documentation Effort translated in Man Weeks | | | Test Case Documentation Equivalent in FTE | | |
|---|---|---|---|---|---|---|
| | Min | Max | Average | Min | Max | Average |
| Number of test steps for new functionality | 46,5 | 58,1 | 52,3 | 6,0 | 7,5 | 6,8 |
| Out of which Critical Flows : Number of test steps for new functionalities | 29,1 | 29,1 | 29,1 | 3,8 | 3,8 | 3,8 |
| Regression package | | | | | | |
| out of which first regressions | 7,4 | 14,8 | 11,1 | 1,0 | 1,9 | 1,4 |
| out of which final regression | 17,4 | 17,4 | 17,4 | 2,3 | 2,3 | 2,3 |
| Team Lead in FTE | 3,43214 | 3,43214 | 3,432143 | 0,775 | 0,775 | 0,775 |
| Number of Test Preparation Week | | | | | | |
| Total if coverage of full new functionalities | 87 | 106 | 96 | 10,02 | 12,49 | 11,26 |
| Total if coverage of critical new functionalities | 69 | 77 | 73 | 7,76 | 8,72 | 8,24 |

| Test Cases Key-in Effort | Test Case Key-in Effort in Man days | | | Test Case Execution Equivalent in FTE | | |
|---|---|---|---|---|---|---|
| | Min | Max | Average | Min | Max | Average |
| Number of test steps for new functionalities | 21,9 | 27,3 | 24,6 | 3,3 | 4,2 | 3,7 |
| Out of which Critical Flows : Number of test steps for new functionalities | 13,7 | 13,7 | 13,7 | 2,1 | 2,1 | 2,1 |
| Regression package | | | | | | |
| out of which first regressions | 7,0 | 13,9 | 10,5 | 1,1 | 2,1 | 1,6 |
| out of which final regression | 16,4 | 16,4 | 16,4 | 2,5 | 2,5 | 2,5 |
| Team Lead in FTE | 4,93 | 4,93 | 4,93 | 0,75 | 0,75 | 0,75 |
| Nber of Test Preparation Week | | | | | | |
| Total if coverage of full new functionalities | 78 | 90 | 84 | 7,63 | 9,53 | 8,58 |
| Total if coverage of critical new functionalities | 69 | 76 | 73 | 6,39 | 7,45 | 6,92 |

FIG. 6c

| Number of Defects (calculated on Test steps) | Average nber of test steps | Defects | | | Average nber of testing weeks |
|---|---|---|---|---|---|
| | | Min | Max | Average | |
| % of Defect on Standard Test weeks | | 8% | 15% | 12% | 6,57 |
| on new functionalities | 7500 | 600 | 1125 | 863 | |
| Out of which Critical Flows : Number of test steps for new functionalities | 3750 | 300 | 563 | 431 | |
| % of Test on Regression Test weeks | | 3% | 5% | 4% | 5 |
| Regression package | 6413 | 192 | 321 | 257 | |
| out of which retest (during testing period) | 1913 | 57 | 96 | 77 | |
| out of which final regression (during final Regression week) | 4500 | 135 | 225 | 180 | |
| Total if coverage of full new functionalities | 13913 | 792 | 1446 | 1119 | |
| Total if coverage of critical new functionalities | 17663 | 492 | 883 | 688 | |
| | | | | Total weeks | 11,57 |

702 points to "% of Defect on Standard Test weeks" row
704 points to "% of Test on Regression Test weeks" row

FIG. 7a

| | # Defects per test week | | |
|---|---|---|---|
| | Min | Max | Average |
| Average if coverage of full new functionalities | 134 | 242 | 188 |
| Average number of Defects per week during execution | 100 | 186 | 143 |
| Average number of Defects per week during final regression | 34 | 56 | 45 |
| Average if coverage of critical new functionalities | 88 | 156 | 122 |
| Average number of Defects per week during execution | 54 | 100 | 77 |
| Average number of Defects per week during final regression | 34 | 56 | 45 |

706 points to header row
708 points to "Average number of Defects per week during final regression" row

FIG. 7b

|  |  | Defects during Execution | | | | Defects during Final Regression | | | Grand Total Execution + Final Regression | | |
| --- | --- | --- | --- | --- | --- | --- | --- | --- | --- | --- | --- |
| Repartition per severity for full coverage |  | Min | Max | Average |  | Min | Max | Average | Min | Max | Average |
| Severity 1 | 20% | 131 | 244 | 188 | 20% | 27 | 45 | 36 | 158 | 289 | 224 |
| Severity 2 | 50% | 329 | 610 | 470 | 50% | 68 | 113 | 90 | 396 | 723 | 560 |
| Severity 3 & 4 | 30% | 197 | 366 | 282 | 30% | 41 | 68 | 54 | 238 | 434 | 336 |
| Total |  | 657 | 1221 | 939 |  | 135 | 225 | 180 | 792 | 1446 | 1119 |
|  |  | Defects during Execution | | | | Defects during Final Regression | | | Grand Total Execution + Final Regression | | |
| Repartition per severity for coverage of critical Functionalities |  | Min | Max | Average |  | Min | Max | Average | Min | Max | Average |
| Severity 1 | 20% | 71 | 132 | 102 | 20% | 27 | 45 | 36 | 98 | 177 | 138 |
| Severity 2 | 50% | 179 | 329 | 254 | 50% | 68 | 113 | 90 | 246 | 442 | 344 |
| Severity 3 & 4 | 30% | 107 | 197 | 152 | 30% | 41 | 68 | 54 | 148 | 265 | 206 |
| Total |  | 357 | 658 | 508 |  | 135 | 225 | 180 | 492 | 883 | 688 |

FIG. 7c

| Rough Effort in Defect Management | Number of weeks of tests during Test execution | Number of weeks of tests during Final Test regression | Number of Solution teams | % of Increase due to Number of Solution Lab | Impact of application tests in Parallel | Change Management Coefficient impact | Global Customer Organisation Complexity Impact |
|---|---|---|---|---|---|---|---|
| Team Staffing Elements if full new functionalities | 6,57 | 4 | 3 | 100% | 100% | 25% | 20% |

| Rough Effort in Defect Management | Total Defect Management effort in FTE for the Test Execution Period | | | Total Defect Management effort in FTE for the Final Regression Period | | |
|---|---|---|---|---|---|---|
|  | Min | Max | Average | Min | Max | Average |
| Team Staffing Elements if full new functionalities | 2,53 | 4,38 | 3,46 | 0,82 | 1,11 | 0,97 |
| Team Staffing Elements if only critical functionalities | 1,55 | 2,53 | 2,04 | 0,82 | 1,11 | 0,97 |
| Technical Team Lead in FTE | 1,0 | 1,0 | 1,0 | 1,0 | 1,0 | 1,0 |
| Total Team | 3,53 | 5,38 | 4,46 | 1,82 | 2,11 | 1,97 |

FIG. 8

| Rough Effort in Defect Analysis | Number of weeks of tests during Test execution | Number of weeks of tests during Test regression | Number of Release in Parallel | Impact of Number of Release in Parallel | Change Management Coefficient impact | Total % of Variation |
|---|---|---|---|---|---|---|
| Team Staffing Elements if full new functionalities | 6,57 | 4 | 1 | 5% | 25% | 30% |

| Rough Effort in Defect Analysis | Average Defects treated per man/Week | | | Total Defect Analysis effort in FTE for the test Period | | | Total Defect Management effort in FTE for the Final Regression Period | | |
|---|---|---|---|---|---|---|---|---|---|
| | Min | Max | Average | Min | Max | Average | Min | Max | Average |
| Team Staffing Elements if full new functionalities | 20 | 40 | 30 | 6,50 | 6,04 | 6,19 | 2,93 | 2,44 | 2,60 |
| Team Staffing Elements if only critical functionalities | 20 | 40 | 30 | 3,53 | 3,25 | 3,35 | 2,93 | 2,44 | 2,60 |
| Technical Team Lead in FTE | | | | 0,50 | 0,50 | 0,5 | 0,50 | 0,50 | 0,5 |
| Total if full new functionality | 20 | 40 | 30 | 7,00 | 6,54 | 6,69 | 3,43 | 2,94 | 3,10 |
| Total if only critical | | | | 4,03 | 3,75 | 3,85 | 3,43 | 2,94 | 3,10 |
| Number of Defects for new functionalities | | | | 657 | 1221 | 939 | | | |
| Out of which Critical Flows : Nber of defects for new functionalities | | | | 357 | 658 | 508 | | | |
| Number of Defects on Regression package | | | | | | | 135 | 225 | 180 |

| Type of Tests | FTE | Delay in weeks | FTE | Delay in weeks | FTE for Regression | FTE for RAF closure | Delay in weeks |  | Delay in weeks |
|---|---|---|---|---|---|---|---|---|---|
| Functional Capability Tests + Usage Tests |  | 4,43 |  | 6,57 |  |  | 5,00 |  | 16,00 |
| Test Case Preparation | 10,57 |  | 5,29 |  |  |  |  |  |  |
| Test Case Execution |  |  | 5,48 |  | 3,48 | 0,00 |  |  |  |
| Total Test Case Prep + Execution | 10,57 |  | 10,77 |  | 3,48 | 0,00 |  |  |  |
| *Test Case Prep + Execution with full FTE Approach* | 11,00 |  | 11,00 |  | 4,00 | 0,00 |  |  |  |
| Defect Management Effort - without full FTE approach | 0,00 |  | 4,46 |  | 1,97 | 0,00 |  |  |  |
| *Defect Management Effort - rounded with full FTE approach* | 0,00 |  | 5,00 |  | 2,00 | 0,00 |  |  |  |
| Defect Analysis Effort - without full FTE approach | 0,00 |  | 6,69 |  | 3,10 | 0,00 |  |  |  |
| *Defect Analysis Effort - rounded with full FTE approach* | 0,00 |  | 7,00 |  | 4,00 | 0,00 |  |  |  |
| Add Management | 1,00 |  | 1,00 |  | 1,00 |  |  |  |  |
| Total T1 + T2 with Management without full FTE approach | 12 |  | 23 |  | 10 |  |  |  |  |
| *Total T1 + T2 with Management with full FTE approach* | 12 |  | 24 |  | 11 |  |  |  |  |

FIG. 10b

TEST EFFORT ESTIMATOR

TECHNICAL FIELD OF THE INVENTION

The present invention relates to a system and method of evaluating the test effort to be provided for functional testing in an application development project.

BACKGROUND OF THE INVENTION

In order to properly evaluate the test effort in an application development project, Project Managers and Business Managers must make estimates of person hours or days that will be required in the test effort. As test effort is a compromise between delay and quality, it is all the more important to define the right balance between those two parameters. In the last ten years, the test percentage in development projects has more than doubled. As a result, more and more projects are not implemented. Many of tools have been issued on the subject, but focusing more on application integration, when the problem is not only focused on the application, but on the global system where the application is to be integrated.

Conventional solutions to test effort estimation are based on development effort (estimation in hours or function points). To illustrate such an approach, an article from K. Bassin et al. entitled "Metrics to evaluate vendor-developed software based on test case execution results", in IBM Systems Journal, Vol. 41, No. 1, 2002 describes an approach centered on the application, which is not an End-to-End approach of business flow cross applications. The limitation of this approach is that it does not enable a customer to measure business risks. And this prevents a customer business from having a focus vision of Information Technology (IT).

None of the known solutions are based on a functional risk analysis. However, this approach is key nowadays to avoid spending time on mathematical occurrences, that are ever increasing, due to applications interphasing with multiple other applications, these occurrences being far from used on the business side. Since today's systems are more and more open and communicating with other multi-technologies systems, logical occurrences are now gigantic. The only way to define efficiently the test effort is thus to focus on the functional business flows, and define with the customer, based on business risks, where to put the test focus. The effort of development is no longer the only metric to evaluate testing effort.

Another limit to actual approaches, is that these are developed for technologies and development languages, whereas nowadays business scenarios are based on several applications which are cross-technologies.

There is a need for a consistent evaluating approach for global test effort, based on functional tests, that works with cross-technologies and enables a first hand sizing.

The present invention offers a solution concentrated on business usage, and consequent business risks, whatever the technology supporting the scenarios.

OBJECTS AND SUMMARY OF THE INVENTION

Accordingly one object of the invention is to evaluate the test effort to be provided in an application development project.

Accordingly another object of the invention allows securing a fair return on test investment and identifying the key areas for the users.

Accordingly yet another object of the invention allows implementing a business focused approach and a sound economical test strategy.

Accordingly still yet another object of the invention compares risk taken in not testing thoroughly such or such part of a system by evaluating the errors and severity during production cycles.

According to a first embodiment of the invention, a method of evaluating a test effort to be deployed in an application development project is provided. The method comprises the steps of:
  (a) collecting customer data for defining a set of test parameters, wherein the set comprises test parameters related to test coverage, to test duration, to quality of a solution, and to productivity;
  (b) computing a test case management effort and a defect effort using the set of test parameters;
  (c) using the results of the computing step to generate a test effort consolidated measurement; and
  (d) generating a final summary report including the consolidated measurement.

According to another aspect of the present invention there is provided a system of evaluating a test effort to be provided in an application development project, the system comprising:
  (a) means for collecting customer data for defining a set of test parameters, wherein the set comprises test parameters related to test coverage, to test duration, to quality of a solution, and to productivity;
  (b) means for computing a test case management effort and a defect effort using the set of test parameters;
  (c) means for using the results of the computing step to generate a test effort consolidated measurement; and
  (d) means for generating a final summary report including the consolidated measurement.

According to yet another aspect of the present invention there is provided a computer program product tangibly embodied in a computer-readable medium comprising instructions for evaluating a test effort to be deployed for functional testing in an application development project, by carrying out the steps of:
  (a) collecting customer data for defining a set of test parameters, wherein the set comprises test parameters related to test coverage, to test duration, to quality of a solution, and to productivity;
  (b) computing a test case management effort and a defect effort using the set of test parameters;
  (c) using the results of the computing step to generate a test effort consolidated measurement; and
  (d) generating a final summary report including the consolidated measurement.

BRIEF DESCRIPTION OF THE DRAWINGS

Reference will now be made, by way of example, to the accompanying drawings in which:

FIG. 1 is a flow chart showing the main steps to operate the method of the present invention;

FIG. 2 is an illustration of a test coverage parameters table;

FIG. 3 is an illustration of a test duration parameters table;

FIG. 4 is an illustration of a solution quality parameters table;

FIGS. 5a-5c are an illustration of productivity parameters tables;

FIGS. 6a-6c are an illustration of a test case effort calculation table;

FIGS. 7a-7c are an illustration of defect evaluation table;

FIG. 8 is an illustration of a defect effort calculation table;

FIG. 9 is an illustration of a test effort consolidated table;

FIGS. 10a-10b are an illustration of a worksheet customer summary report.

DETAILED DESCRIPTION OF THE PREFERRED EMBODIMENT

Figure 10A:
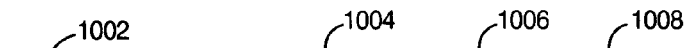

Referring first to FIG. 1, a general flow chart 100 of the main steps to operate the method of the invention is shown.

The steps of FIG. 1 may be implemented on computer program code in combination with the appropriate hardware. The computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Those skilled in the art will recognize that while a full structure of a data processing system suitable for operating the present invention is not herein described, its construction and operation may conform to current implementations known in the art. In particular, it is to be noted that the steps of the present method may be operated in a client-server mode from distributed systems connected through any type of computer network (public or private).

At first step 102, a plurality of data to be used for the calculation of an effort are collected. The data are classified into at least four categories, according to the invention, which relate to:
  coverage/scope of a test;
  duration of the test;
  quality of a solution; and
  productivity.

For the sake of brevity, the main terms used in this description are hereinafter defined but the reader would also likely refer to any glossary on the subject field, such as the "IEEE Standard Glossary of Software Engineering Terminology" to find more details about the testing field.

Test coverage: Defines the extent to which testing covers a product's complete functionality.

Scenario: A high-level description of how a given business or technical requirement will be tested, including the expected outcome; later decomposed into sets of test conditions, each in turn, containing test cases.

Change Request: A documented proposal for a change of one or more work items or work item parts.

Regression: Rerunning test cases which a program has previously executed correctly in order to detect errors spawned by changes or corrections made during software development and maintenance.

Defect severity: Every defect has a severity level attached thereto, measured on a severity scale from the lowest to the highest.

Test Steps: A sequence of actions that executes a test case. A Test script includes detailed instructions for set up, execution, and evaluation of results for a given test case.

Details of each parameter category are now discussed with reference to FIGS. 2 to 5.

The first parameter category namely the 'Test Coverage' parameters category is illustrated by FIG. 2. The functional coverage 202 is split into three sub-categories, namely: a 'Number of new functionalities', a 'Number of business scenarios impacted' and an 'Out of which number of critical Business Scenarios+Most used flows impacted'. The user fills in corresponding rows 204 with metrics which are contemplated as a minimum (Mini), a maximum (Max) or as an average.

It is to be appreciated that the values shown in the figures are just for the sake of example and not to be interpreted as limiting the present invention to a particular application since the system and method is applicable to nearly any business environment where a project is to be developed.

The user keys in the following data:
  the number of Total scenarios 206 wherein one scenario is equal to n Test Cases (wherein 'n' is a numeral to be defined);
  the number of Grand Total Test Steps (TS) 210, split in:
    Total Test Steps baseline;
    Out of which Key Business Test Steps;
    Intermediate Test Step Regression;
    Test Steps Final Regression; and
    Change Requests impact which is the percentage of additional Test Steps.

It is to be appreciated that in the intent of providing a user friendly tool, the areas to be completed by the user may be, for example, highlighted in various colors to guide the user in order to fill the correct cells.

Then the process computes a number of Test Cases (TC) 208, wherein one Test Case is defined as an average ratio of Test Steps.

The second parameters category defined in step 102, namely the 'Test Duration' is illustrated in FIG. 3. This category allows the user to define a Number of Testing Weeks 302. As shown in FIG. 3, the user indicates in corresponding rows a starting date for the test and the number of weeks the test is to last (respectively starting date is Mar. 1, 2005 and 15 weeks in the example). The number of testing weeks is split into several categories: 'Test preparation', 'Effective Testing without Final Regression', 'Effective Final Regression & Closure', and 'Forecasted Outage in weeks'. The whole parameters are converted in a 'Number of Testing Days' 304.

The third parameters category defined in step 102, namely the 'Solution Quality' is shown in FIG. 4 as Table 400. The quality is evaluated through several sub-categories that can be adjusted as the test begins. In the present example the categories cover the 'Design quality/Requirement Stability' 402, a 'Solution complexity' 404, the 'Number of Defects' 406, a 'Defects turnaround time in days in development' 408 and the 'Number of Re-test to correct one defect' 410. For each category, a corresponding metric is indicated either as a numeric value or as a percentage (as shown in the columns of Table 400). For example, the 'Design quality/Requirement stability' or the 'Solution complexity' may be appreciated on a numeral scale between 1 to 5, wherein 1 is the lowest value and 5 is highest. Similarly, the 'Number of Defects' may be indicated as a percentage (9% in the present example). As shown in FIG. 4, this latter category may be also subdivided to further indicate a number of defects 'for baseline+intermediate Regression' (equal to 906 in the example), a number of defects 'for Change Request Impact' (equal to 317 in the example) and a number of defects 'for Final Regression' (equal to 135 in the example). Each subdivision of the number of defects is measured according to the defect severity.

The Solution Quality parameter also covers 'Defect turnaround time in days in development' 408 which measures the time (in days) taken by development teams between when a defect is assigned and a patch/correction is delivered on the test environment.

A last field encompassed by the Solution Quality parameter is the number of further tests to be processed to correct one defect 'Number of Re-test to correct one defect' 410.

The fourth parameters category defined in step 102, namely the 'Productivity Parameters' is illustrated in FIGS. 5a to 5c. The productivity is evaluated through several sub-categories.

The first productivity sub-category is the 'Defect Analysis effort' 502 as shown in FIG. 5a which aims to define the effort needed to execute a first level defect analysis to be in a position to define the defect origin and to affect a solution team to correct it.

The defect analysis effort is measured by an average number of defects analyzed per man/week (equal to 30 in the Figure), the impact of the number of releases in parallel (equal to 5%) and the number of releases in parallel, i.e. meaning the number of releases during the same test time frame (equal to 1 in the example).

The second productivity sub-category is the 'Team Leaders in FTE' 504 as illustrated in FIG. 5b. These parameters can be adjusted according to the final evaluation and are measured on Test Cases (or Steps) documentation Management in Full Time Equivalent (FTE), on Test Cases (or Steps) Key-in Management in FTE, on Defect Management in FTE during test execution phase, and on Defect Analysis Management in FTE during test execution phase.

The third productivity sub-category illustrated in FIG. 5c aims to define the global productivity metrics to prepare and key-in a test step, and all related activities. Those parameters are adjusted according to the customer history and reflect an 'Average Time to Produce' 506 by measuring:
- an 'Average Time to prepare a Test Step in minutes';
- an 'Average Time to key-in a Test Step in minutes';
- a 'Data attribution factor in percentage';
- a 'Productivity factor in percentage';
- a 'Change management ratio in percentage'; and
- an 'Average time to document an error in percentage'.

In general, the following standard ratio ranges are applied:
- 85% for the 'Productivity factor' when excluding meetings and coordination time from productive hours for test case design and input and from defect management, according to Key Users Team giving all input at the beginning and for a light management process. Otherwise, 80% to 75% in complex project management structure, or up to 50% if there exists a lot of undefined and uncertain design areas;
- for the 'Change management ratio': the best case is taken equal to 10% in a small project, the average is equal to 15% on a limited duration. In a complex and long project where a test duration is between 1 and 2 months, a ratio of 20% is used, and for projects over 3 months, a ratio between 25% to 30% is preferably applied.

However, the skilled person would easily modulate these values according to the customer history without departing from the scope of the invention.

Once all the data and metrics have been collected, defined and agreed to with the customer, two sets of test effort work elements are generated as shown in step 104 of FIG. 1 and as now described with reference to FIGS. 6 to 8. The first set of work elements are related to test case effort and the second set of work elements are related to defect effort.

Test Case Effort Work Elements:

Two types of test case efforts are calculated using the data collected in step 102. A Test Cases Documentation Effort FIGS. 6a and 6b and a Test Case Key-in Effort FIG. 6c. Both test case effort calculations are based on a test case coverage that is shown in Minimum, Maximum and Average, to allow a fork approach and adjustment option for budgeting purposes.

Test Cases Documentation Effort:

FIG. 6a shows the different work elements calculated (listed in column 602):
- Number of test steps for new functionalities;
- Out of which Critical Flows: Number of test steps for new functionalities;
- Regression package, split in:
  - out of which first regressions; and
  - out of which final regression;
- Number of Test Preparation Week;
- Total if coverage of full new functionalities; and
- Total if coverage of critical new functionalities.

All these factors are calculated and provided in a number of test steps with the hypothesis of full coverage and also with the hypothesis of Minimum and Average coverage (exemplary values in the respective columns).

FIG. 6b illustrates the result of the test case documentation effort of FIG. 6a as converted in Man/Weeks 604 and Full Time Equivalents 606 from the Test Case Coverage previously defined. A synthesis of Test Case Coverage is setup from the input parameters defined in step 102 (an average time to prepare a Test Step converted in man/days and man/weeks, a Data attribution factor, a Productivity factor and a Change management ratio) and these parameters are then used to obtain the test case documentation effort values among which: Number of Test Preparation Weeks, for coverage of new functionalities, or reduced to critical business coverage.

This step allows calculation of the effort in man/days and in Full Time Equivalent, in the number of weeks of preparation phase 608 and in the first half of the execution phase.

Test Cases Key-in Effort: FIG. 6c illustrates the result of the Test Case Key-in Effort 610 calculated in Man/days (or in Man/Weeks) and converted in Full Time Equivalent from the Test Case Coverage previously defined. A synthesis of Test Case Coverage is setup from the input parameters defined in step 102 (an average time to key-in a Test Step converted in man/days, a Number of Re-test to correct 1 defect, an Average time to document an error, a Productivity factor, and a Change management ratio) and several relevant parameters are then used to obtain the test-case key-in effort values among which the Number of Test Execution Weeks, for coverage of new functionalities, or reduced to critical business coverage.

This step allows calculation of the effort—in man/days and in Full Time Equivalent—in the number of weeks of the execution phase.

Defect Effort Work Elements: As discussed previously, a second set of work elements related to defect effort are generated in step 104. This second set is divided into three subsets which will be described hereinbelow:

Defect Evaluation: The first subset provides a defect evaluation. Defect rates are applied for the baseline & intermediate regression and for the final regression on the average coverage metrics. The evaluation is split per type of test cases: new functionalities 702 and regression 704 as illustrated on FIG. 7a. This defect evaluation step provides a global split of the defects on the detailed coverage (full new functionalities and critical new functionalities).

Next a defect distribution per test weeks is applied, as illustrated in FIG. 7b, according to test cycles (execution and final regression), both for a coverage of full new functionalities 706 and for a coverage of critical new functionalities 708. This defect distribution gives for each coverage an 'Average number of Defects per week during execution' and an 'Average number of Defects per week during final regression'.

Finally, a distribution of defects per severity is applied, as illustrated in FIG. 7c, both for a coverage of full new functionalities 710 and for a coverage of critical functionalities 712. The Severity distribution applied is the one previously keyed-in during the "Solution Quality' table fill in phase (% of defects for general defects, for defects generated through change requests, and for defects generated through regression in FIG. 4). This subset provides a number of Defects per severity during "Execution Phase" 714 and during "Final Regression Phase" 716.

Defect Management Effort: The second subset relates to a Defect Management Effort which represents the activity of coordinating the closure of the attributed defects. It consists of obtaining a closure plan and having it applied, allowing the Test Case Key-in plan to be optimized. As illustrated in FIG. 8, a 'Rough Effort in Defect Management' 802 is calculated by multiplying the number of defects with the Defect Management Productivity (Average Number of defects managed per man/week) and the number of defect split per weeks.

The number of defects is pondered by the following factors:
- % of Increase due to Number of Solution Laboratories 804 selected according to the following preferred rules: add a 50% Management per additional solution Lab, i.e. 1 Lab=+0%, 2 Lab=+50%, 3 Lab=+100% . . . );
- Impact of application tests in Parallel 806. This latter is selected according to the following preferred rules: add coordination work as a minimum use 10% per release;
- Change Management ratio 808;
- Global Customer Organization Complexity Impact 810 selected preferably as being 10% for a medium complexity organization, or 20% as an average, or higher for a highest complexity organization.

This subset provides a rough effort in FTE for the Test Execution Period without final regression 812 and for the Final Regression Period 814.

Defect Analysis Effort: The third subset relates to Defect Analysis Effort which represents the activity of analyzing a defect in order to attribute it to the correct development team for its correction. As illustrated in FIG. 9, a 'Rough Effort in Defect Analysis' 902 is calculated through multiplying the number of defects with the Defect Analysis Productivity (Average Number of defects analyzed per man/week) applied to the number of defects per week.

The number of defects is pondered by the following factors:
- Impact of Number of Release in Parallel 904 selected according to the following preferred rules: add between 5 and 10% per additional release in parallel, i.e., one release in parallel=+5%, two releases in parallel=+10%, . . . ); and
- Change Management ratio 906.

This third subset provides a rough effort in FTE for the Test Execution Period without final regression 908 and for Final Regression Period 910.

Returning to FIG. 1, step 106 is a consolidation phase which synthesises the results of step 104. As illustrated by FIG. 10a, the synthesis takes into account the average results for full coverage as previously computed to obtain a corresponding value in Man/days for each type of test as listed in column 1002 on the three main test phases: 'Test Preparation' 1004, 'Test Execution' 1006 and 'Test Closure' 1008.

It is to be appreciated that the system of the invention allows the user to add additional preparation effort and closure effort to cover for example Team training, documentation consolidation, database implementation, etc., in order to complete the evaluation.

As an alternative, the test effort calculation results may also be converted in a FTE values during the consolidation step as illustrated in FIG. 10b. This enables additional FTE effort in the Test Preparation, and the Test Closure for additional support activities.

Additionally, a full FTE staffing calculation may be computed to avoid resources split.

The last step 108 of FIG. 1 may be operated to automatically generate a summary report that is user friendly readable. The report may be in the form a spreadsheet that contains at least an Input Parameter Tab and a Final Consolidation Tab. The summary report may be sent to a remote user workstation over any type of network.

It will be recognized that the previous scenario is used solely as an example, in particular the customer's values used are just for illustration purposes. Those skilled in the art will understand that the principles of the present invention may be similarly implemented whatever the modifications and variations made to the above values without departing from the scope of the invention.

One of the most important advantages of the present invention over traditional test sizing techniques is that the present invention can accommodate multiple parameters. The major influencing parameters within testing applications in complex systems are scope, duration and product quality related, or organization related. For all the parameters, an average range along with explanations and guidance are given, so that a customer can be positioned easily, even if the customer is not accustomed to measurement of the organization. Once the overall process is run, a summary report is produced, and preferably displayed in the form of a spreadsheet that enables one to know the staffing needed to execute the test. The input parameters may then be frozen as a reference.

Since the present invention provides a global evaluation mechanism, it also enables the users to zoom the evaluation at different levels such as by business areas or by subprojects. The initial hypothesis may be easily reassessed, and the calculations may be refined to address an optimal productivity.

What is claimed is:

1. A method of evaluating a test effort to be deployed for functional testing in an application development project, the method comprising the steps of:
    collecting customer data for defining a set of test parameters, wherein the set comprises test parameters pertaining to test coverage, to test duration, to quality of a solution, and to productivity;
    computing, by a computer, a test case management effort and a defect effort using the set of test parameters, wherein said computing the defect effort consists of providing a measurement of a number of defects generated, of a defect management effort to accelerate defect closure and of a defect analysis effort to define defect localization and to attribute it to a resolving team;
    using, by the computer, the results of the computing step to generate a test effort consolidated measurement; and
    generating, by the computer, a final summary report including the consolidated measurement.

2. The method of claim 1, wherein the quality of the solution parameter consists of a design, stability and complexity parameter.

3. The method of claim 1, wherein the step of computing a test case management effort consists of providing a measurement of a test case documentation effort and of a test case key-in effort.

4. The method of claim 1 wherein the step of using the results of the computing step to generate a test effort consolidated measurement further comprises providing a measurement in man/days unit.

5. The method of claim 4, wherein the step of generating a test effort consolidated measurement further comprises providing a measurement in Full Time Equivalent unit.

6. The method of claim 1, wherein generating the final summary report is generated in the form of a spreadsheet.

7. The method of claim 1, further comprising a step of sending the final summary report to a remote computer over a communication network.

8. The method of claim 1, wherein the set consists of said test parameters pertaining to test coverage, to test duration, to quality of a solution, and to productivity.

9. A system comprising a computer, a computer-readable storage medium, and program code tangibly embodied in the storage medium, wherein the computer is configured to execute the program code to implement a method of evaluating a test effort to be deployed for functional testing in an application development project, the method comprising the steps of:

collecting customer data for defining a set of test parameters, wherein the set comprises test parameters pertaining to test coverage, to test duration, to quality of a solution, and to productivity;

computing a test case management effort and a defect effort using the set of test parameters, wherein said computing the defect effort consists of providing a measurement of a number of defects generated, of a defect management effort to accelerate defect closure and of a defect analysis effort to define defect localization and to attribute it to a resolving team;

using the results of the computing step to generate a test effort consolidated measurement; and generating a final summary report including the consolidated measurement.

10. The system of claim 9, wherein the quality of the solution parameter consists a design, stability or complexity parameter.

11. The system of claim 9, wherein the step of computing a test case management effort consists of providing a measurement of a test case documentation effort and of a test case key-in effort.

12. The system of claim 9, wherein the step of using the results of the computing step to generate a test effort consolidated measurement further comprises means for providing a measurement in man/days unit.

13. The system of claim 12, wherein the step of generating a test effort consolidated measurement further comprises means for providing a measurement in Full Time Equivalent unit.

14. The system of claim 9, wherein generating the final summary report is generated in the form of a spreadsheet.

15. The system of claim 9, further comprising means for sending the final summary report to a remote computer over a communication network.

16. The system of claim 9, wherein the set consists of said test parameters pertaining to test coverage, to test duration, to quality of a solution, and to productivity.

17. A computer program product tangibly embodied in a computer-readable storage medium comprising program code configured to be executed on a computer to implement a method of evaluating a test effort to be deployed for functional testing in an application development project, the method comprising the steps of:

collecting customer data for defining a set of test parameters, wherein the set comprises test parameters pertaining to test coverage, to test duration, to quality of a solution, and to productivity;

computing a test case management effort and a defect effort using the set of test parameters, wherein said computing the defect effort consists of providing a measurement of a number of defects generated, of a defect management effort to accelerate defect closure and of a defect analysis effort to define defect localization and to attribute it to a resolving team;

using the results of the computing step to generate a test effort consolidated measurement; and generating a final summary report including the consolidated measurement.

18. The computer program product of claim 17, wherein the quality of the solution parameter consists of a design, stability and complexity parameter.

19. The computer program product of claim 17, wherein the step of computing a test case management effort consists of providing a measurement of a test case documentation effort and of a test case key-in effort.

20. The computer program product of claim 19, wherein the step of using the results of the computing step to generate a test effort consolidated measurement further comprises providing a measurement in man/days unit.

21. The computer program product of claim 20, wherein the step of generating a test effort consolidated measurement further comprises providing a measurement in Full Time Equivalent unit.

22. The computer program product of claim 17, wherein generating the final summary report is generated in the form of a spreadsheet.

23. The computer program product of claim 17, further comprising a step of sending the final summary report to a remote computer over a communication network.

24. The computer program product of claim 17, wherein the set consists of said test parameters pertaining to test coverage, to test duration, to quality of a solution, and to productivity.

* * * * *